(12) United States Patent
Fin et al.

(10) Patent No.: US 6,253,344 B1
(45) Date of Patent: Jun. 26, 2001

(54) SYSTEM AND METHOD FOR TESTING A MICROPROCESSOR WITH AN ONBOARD TEST VECTOR GENERATOR

(75) Inventors: Brian P. Fin; Daniel J. Dixon, both of Thornton, CO (US)

(73) Assignee: Hewlett Packard Company, Palo Alto, CA (US)

( * ) Notice: Subject to any disclaimer, the term of this patent is extended or adjusted under 35 U.S.C. 154(b) by 0 days.

(21) Appl. No.: 09/182,715

(22) Filed: Oct. 29, 1998

(51) Int. Cl.⁷ ............................................. G06F 11/00
(52) U.S. Cl. ................................. 714/738; 714/742
(58) Field of Search .................................. 714/724, 729, 714/739, 30, 718, 727, 738, 742; 709/246; 702/186

(56) References Cited

U.S. PATENT DOCUMENTS

| | | | |
|---|---|---|---|
| 5,592,493 | * | 1/1997 | Crouch et al. ........................ 714/729 |
| 5,610,927 | | 3/1997 | Segars ................................. 371/22.3 |
| 5,646,949 | * | 7/1997 | Bruce, Jr. et al. ..................... 714/739 |
| 5,694,399 | * | 12/1997 | Jacobson et al. ..................... 709/246 |
| 5,729,554 | | 3/1998 | Weir et al. ............................. 371/27 |
| 5,768,152 | * | 6/1998 | Battaline et al. ..................... 702/186 |
| 5,771,241 | | 6/1998 | Brummel .............................. 371/22.5 |
| 5,784,550 | | 7/1998 | Brockmann et al. ............ 395/183.09 |
| 5,799,021 | | 8/1998 | Gheewala .............................. 371/22.1 |
| 5,862,152 | * | 1/1999 | Handly et al. ......................... 714/727 |
| 6,003,142 | * | 12/1999 | Mori ......................................... 714/30 |

* cited by examiner

Primary Examiner—Albert Decady
Assistant Examiner—David Ton

(57) ABSTRACT

A system for testing a microprocessor having a core execution unit, an internal memory, and a data port may comprise a tester having a data port which is connected to the microprocessor data port. A test vector generator program is transferred from the tester to the internal memory of the microprocessor for testing the microprocessor when the test vector generator program is executed by the core execution unit. The test vector generator program generates test vectors which are also stored in the internal memory, and which may then be executed by the core execution unit.

7 Claims, 3 Drawing Sheets

SYSTEM AND METHOD FOR TESTING A MICROPROCESSOR WITH AN ONBOARD TEST VECTOR GENERATOR

FIELD OF THE INVENTION

The present invention relates generally to the field of testing microprocessors, and more particularly, to a system and method for testing a microprocessor with a test vector generator stored in on-chip memory.

BACKGROUND OF THE INVENTION

Testing microprocessors is a critical, yet expensive, step of the fabrication process. Microprocessors are formed on silicon wafers, which are very thin, round slices from a cylinder of silicon. Microscopic circuitry for multiple microprocessors is then formed on the silicon wafer. The fabrication must take place in a clean room, i.e., a chamber in which dust or other impurities are reduced to extremely low levels. Any unwanted impurities in the silicon wafer or in the circuitry of a microprocessor can cause it or parts of It to fail. Because a microprocessor may be only several millimeters or centimeters wide, and may comprise millions of transistors, it can be very difficult to test thoroughly. Furthermore, microprocessors are very fragile and easy to damage during the fabrication process. For example, a typical static charge built up as a person walks about normally can be about 10,000 volts, and a static discharge onto a microprocessor can destroy it with only around 5,000 volts.

After the microprocessor circuitry is added to the silicon wafer, the wafer is cut into sections, or die, each containing one microprocessor. Each die is then placed in a package made of a material such as plastic or ceramic. The package also includes electrical contacts which allow connection of the microprocessor inside the package to a circuit board or other electrical system. Since fabricating microprocessors is such an expensive process, they are typically tested at various stages, such as before and after packaging, to allow the earliest possible rejection of defective parts. After the post-packaging test, microprocessors are operated at extreme environmental conditions, or "burned-in," and retested to eliminate those with latent defects which only occur after the microprocessor has been operated.

Microprocessors are generally tested on a parallel-pin tester, an extremely expensive machine with hundreds of electrical contacts and a very large amount of fast memory. Microprocessor instructions called test vectors are stored in the memory of the parallel-pin tester. Test cases, made up of sets of test vectors, are typically written by circuit designers in a time consuming and laborious process, and are therefore of widely varying quality depending upon the efforts and skill of those writing them. It is an extremely difficult task to produce test vectors which thoroughly test a highly complex circuit such as a microprocessor.

A microprocessor, either packaged or unpackaged, is connected to the parallel-pin tester and the test cases are executed in the microprocessor in order to detect failures.

Parallel-pin testers have several disadvantages. The amount of memory in a parallel-pin tester limits the number and size of test cases which can be executed on a microprocessor. Furthermore, the speed of the parallel-pin tester and its memory limit the speed at which the microprocessor can run during the test. Generally, the clock speed of the microprocessors must be slower than normal operating speed during testing on a parallel-pin tester, limiting the efficacy of the test.

Another major challenge of effectively testing microprocessors with a parallel pin tester is the difficulty of keeping the one or more core execution units in a microprocessor occupied and exercised. Microprocessors may have multiple core execution units which must be tested, but the external bandwidth is limited even with a large parallel pin tester. As a result, core execution units may be idle or only minimally exercised during some parallel pin testing.

The cost of parallel-pin testers limits the number that a fabricator can afford to purchase, thus the number of microprocessors that can be tested at one time is limited. This disadvantage is further compounded by the need to test the same microprocessor several times at various stages of fabrication.

A need therefore exists for a system and method of testing microprocessors which is less expensive, enabling simultaneous testing of a greater number of microprocessors. An additional need exists for a system and method of testing microprocessors that can be executed in the microprocessor at its normal operating speed. A further need exists for a system and method of testing microprocessors that more fully occupies and exercises the core execution units of a microprocessor.

SUMMARY

To assist in achieving the aforementioned needs, the inventors have devised a system and method for testing a microprocessor with a test vector generator stored in the microprocessor's internal memory.

A system for testing a microprocessor having features of the present invention comprises a microprocessor having one or more a core execution units, an internal memory, and a data port, and a relatively low cost tester having a data port which is connected to the microprocessor data port. The tester has a low cost interface such as a serial port. The tester may have memory which is relatively smaller and slower, therefore less expensive, than the memory required in a parallel pin tester.

A test vector generator program is transferred from the tester to the internal memory of the microprocessor for testing the microprocessor when it is executed by the core execution unit. The test vector generator program generates test vectors which are also stored in the internal memory, and which may then be executed by the core execution unit.

The microprocessor data port is generally a low cost interface such as a serial port. In a preferred embodiment, the serial interface may comprise a JTAG test interface. The test vector generator program and the generated test vectors may be executed by the core execution unit at the full clock speed of the microprocessor.

The present invention may also comprise a method for testing a microprocessor having a core execution unit, an internal memory and a data port, including providing a tester having a data port and a memory, and providing a test vector generator program in the memory of the tester. The method further includes connecting the microprocessor data port to the tester data port, transferring the test vector generator program from the tester through the tester data port to the internal memory through the microprocessor data port, and executing the test vector generator program in the core execution unit to generate test vectors.

BRIEF DESCRIPTION OF THE DRAWING

An illustrative and presently preferred embodiment of the invention is illustrated in the drawing, in which.

DESCRIPTION OF THE PREFERRED EMBODIMENT

Figure 1:
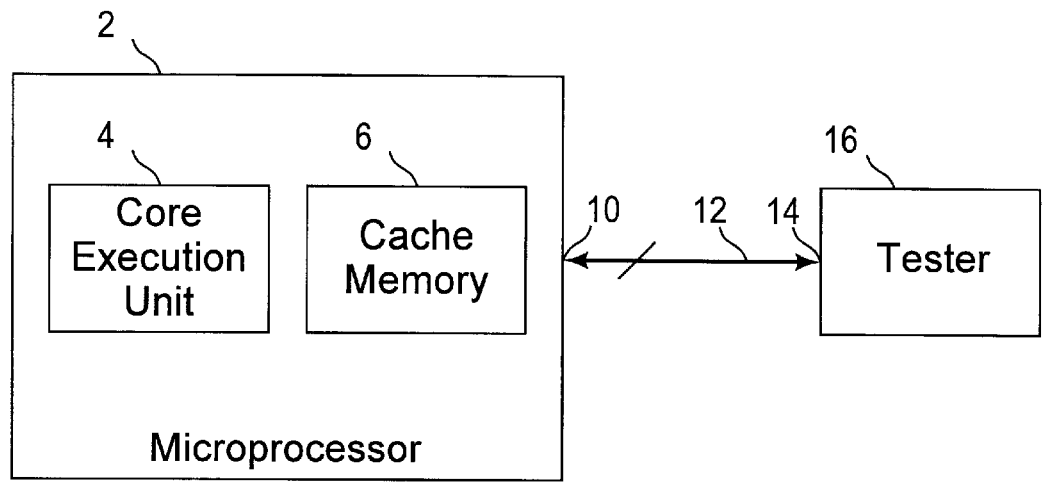
FIG. 1 is a block diagram of a system for testing a microprocessor.

FIG. 1 illustrates a preferred embodiment of a system for testing a microprocessor 2. A tester 16 may be connected to a microprocessor 2 in order to run test vectors, or test instructions, on the microprocessor 2. However, unlike prior parallel pin testers, which held all the test vectors in fast, large memory circuits, the tester 16 of the preferred embodiment holds a test vector generator program which is transferred to the microprocessor 2 to generate test vectors internally to the microprocessor 2. Thus, instead of connecting a parallel pin tester to a microprocessor 2 with a large number of connections, and executing test vectors at a frequency or speed less than the full design frequency of the microprocessor 2, the microprocessor 2 can generate its own test vectors and execute them at full speed. This lowers the cost of the test equipment, increases the number of test vectors which may be executed, and increases the efficacy of the test, since more test vectors can be executed (and at full speed).

In addition, generating the test vectors internally and running them at full speed offers improved test coverage of microprocessors with extensive parallelism. Such microprocessors which can perform multiple tasks in parallel are difficult to exercise fully through external interfaces. However, with the test vectors supplied internally to the microprocessor the external bandwidth is not a limitation.

The microprocessor 2 may be tested by the tester 16 at any desired time during the various stages of fabrication, such as when multiple microprocessors 2, or dice, are still on an uncut silicon wafer. The microprocessor 2 die may also be tested after it is cut, after it is packaged, or after a "burn-in" phase during which it is operated in environmental extremes (i.e., to allow latent defects to surface).

The test vector generator program may comprise any program which generates instructions for the microprocessor 2 to execute. In a preferred embodiment, the test vector generator is a random code generator (RCG), such as those described in the following patents which are hereby incorporated by reference for all that is described therein. U.S. Pat. No. 5,729,554, U.S. Pat. No. 5,784,550, and U.S. Pat. No. 5,771,241. An RCG generates pseudo-random test vectors based on a random number, or "seed," which is passed as an input to the RCG. Each seed value will cause the RCG to produce the same test vectors, in order to allow a test to be reproduced.

After the RCG has generated a set of test vectors, also referred to as a case, the case is stored in an empty area of the internal memory. An exemplary test case of moderate length for debugging purposes might be in the range of about 20 to 30 instructions, since it is desirable during debugging to cause an error in as few instructions as possible in order to isolate the causes of errors and to reduce the elapsed time. However, in the preferred embodiment, the purpose of the test cases is more for determining whether the microprocessor is defective than where errors were located. Therefore, test cases in the preferred embodiment are longer and the length of the test cases is limited only by the available amount of internal memory and by the testing needs. The number of test cases which can be generated and run is essentially unlimited, since each new test case may be stored in the same memory location after the previous test case is completed.

Once the test case is stored in the internal memory, the RCG causes the microprocessor 2 to execute the test vectors in the case. The test vectors may be executed at various stages of generation. For example, the test vectors could be executed one by one as they are generated, or not until several cases have been generated. In a preferred embodiment, each case is executed "at speed" after it has been fully generated and stored.

To transfer the RCG to the microprocessor 2 and initiate execution, standard microprocessor dependent methods may be employed. For example, if the data port 10 comprises a JTAG interface, the JTAG protocol includes methods of initializing the microprocessor, loading data to the cache, and placing the microprocessor in a desired state. The JTAG interface is described in U.S. Pat. No. 5,610,927 which is hereby incorporated by reference for all that is disclosed therein. Alternatively, if the microprocessor includes Direct Access Test (DAT) hardware, the DAT protocol includes methods of initializing the microprocessor, loading data to the cache, and placing the microprocessor in a desired state. The DAT interface is described in U.S. Pat. No. 5,799,021 which is hereby incorporated by reference for all that is disclosed therein.

Also, in a preferred embodiment, the RCG includes a command interface. Through this interface, the RCG is focused to generate test vectors aimed at testing specific areas of the microprocessor 2, or is focused to perform other tests such as toggle-testing, also referred to as "stuck-at" testing. Toggle testing comprises attempting to cause every electrical node in the microprocessor 2 to change state in order to find short circuits. In other words, every switch is turned on or off to make sure that it functions as designed.

Once the microprocessor has executed a test case, the RCG verifies the results by comparing the state of the microprocessor with an expected state. For example, if the test case should have set a register to a given value, the contents of the register are compared with the expected contents. The RCG reports the results to the tester 16, either after running all the test cases or as soon as there is an error.

Having generally described a system for testing a microprocessor, as well as some of its more significant features and advantages, some of the various embodiments of such a system will now be described in more detail.

As illustrated in FIG. 1, a microprocessor 2 comprising a core execution unit 4 and an internal memory 6 is connected to a tester 16. The microprocessor 2 may comprise any electronic processor, such as an integrated processor fabricated on a silicon substrate, having a core execution unit 4 for executing instructions or processing data, and an internal memory 6. The internal memory 6 may comprise a cache memory or any other memory internal to the microprocessor 2, and may comprise one or a plurality of distinct memories.

The tester 16 comprises a low cost interface to exchange information with the microprocessor under test. In a preferred embodiment, the interface comprises a low pin count serial port 14 which connects to a serial port 10 on the microprocessor 2 across a serial bus 12. In a preferred embodiment, the tester serial port 14 and the microprocessor serial port 10 comprise scan latches. The microprocessor serial port 10 may also comprise any ocher type of serial interface, such as a JTAG interface.

The tester 16 also comprises a low cost memory, which may be relatively slow, in which a test vector generator such as a random code generator (RCG) is stored. After a microprocessor 2 has been connected to the tester 16 via a serial connection 12, the RCG is transferred from the tester 16 to the internal memory 6 of the microprocessor 2.

The RCG may be loaded with seed values or other focusing instructions before storing it in the tester 16 for use. Alternatively, seed values may be passed to the RCG while it is in the tester 16, or after it has been transferred to the microprocessor 2.

The core execution unit 4 of the microprocessor 2 then executes the RCG. The tester 16 may also comprise a timer which is started when the RCG is executed. If the RCG does not report test completion within a predetermined amount of time, for example if the microprocessor 2 under test is completely defective and cannot execute the RCG, the timer in the tester 16 will reach the predetermined value and the tester 16 can indicate that the microprocessor 2 is defective.

In another embodiment, a short and rudimentary test case is run before longer test cases to save time waiting for test completion or a timeout condition in defective microprocessors 2. This embodiment quickly informs the tester 16 if the microprocessor 2 is incapable of executing the RCG, since the timeout value on the preliminary rudimentary test case is relatively short.

Alternatively, in another embodiment, the RCG frequently sends status reports to the tester 16 during execution of the RCG and the test cases, and the tester 16 timeouts are shortened to a value just greater than the expected time period for receiving status reports. In this embodiment, the tester can cancel the test and indicate that the microprocessor 2 is defective as soon as it receives a status message indicating an error, before the test cases have all been executed.

When the RCG is executed, it generates a test case comprising a set of test vectors which is then stored in the internal memory 6. The core execution unit 4 is then caused to execute the test case by the RCG. In one embodiment, the RCG may also set a timer to a predetermined value. If the core execution unit 4 does not complete the test case and return control to the RCG within the predetermined time, the timer will reach the predetermined value and return control to the RCG. The RCG may then report an error to the tester 16 via the serial connection 12.

After the core execution unit 4 has completed the test case, the last instruction of the test case will return control to the RCG program, which will then check the results of the test. The RCG prepares, or is loaded with, expected results along with the test vectors, comprising an expected state of the microprocessor 2. The RCG may look at elements such as the microprocessor 2 registers, the cache state, or the translation lookaside buffer entries (a cache holding page translations for virtual memory). In addition, if any external memory is connected to the microprocessor, as will be described below with respect to FIG. 6, the RCG may check the memory locations which should have been modified during execution of the test case.

If the RCG program finds that the state of the microprocessor 2 is not as expected after executing a test case, the RCG may transmit an error code across the serial connection 12, indicating that an error occurred. The error code may also contain information about what area of the microprocessor 2 is likely defective, depending on what test failed. The contents and format of the error code is dependent upon the design of the microprocessor 2. The error codes returned by the RCG may be tailored for the design requirements of the specific microprocessor 2 and its fabrication process. For example, error codes may be designed to help locate manufacturing processes that need improvement. Error codes may be transmitted at the end of the testing procedure after all test cases have been run, or preferably, upon the first failure. The RCG may then continue to run other test cases, or may simply stop after indicating the first failure to the tester 16.

If all the test cases are successfully generated and executed, the RCG transmits a message to the tester 16 across the serial connection 12 indicating that the microprocessor 2 passed the test.

The preferred embodiment has several important advantages. The tester 16 does not require the vast, expensive and fast memory required by parallel pin testers. The execution of the RCG from internal memory 6 acts to test the microprocessor 2 in addition to the test vectors. The microprocessor 2 is also tested more fully by executing the RCG and the test vectors at full speed, rather than at a reduced speed limited by a parallel pin tester. The parallel pipelines of a complex microprocessor are more fully tested, since the external bandwidth is not a limiting factor during execution of the test cases. Therefore, the expense of trying to provide parallel pin testers with memory and interfaces fast and wide enough to keep up with advanced microprocessors is avoided.

Figure 2:
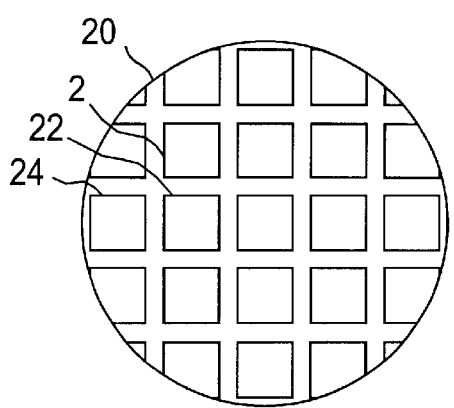
FIG. 2 is a top plan view of a silicon wafer with multiple microprocessor dice.

As has been mentioned briefly above, the microprocessor 2 may be tested at various stages of fabrication. As illustrated in FIG. 2, microprocessors (e.g., 2) are fabricated on a silicon wafer 20, a thin disk of silicon. Multiple microprocessors (e.g., 2, 22, and 24) are fabricated on a single silicon wafer 20. The microprocessors (e.g., 2, 22, and 24), or dice, are then sliced apart into individual die, as illustrated in FIG. 3.

Figure 3:
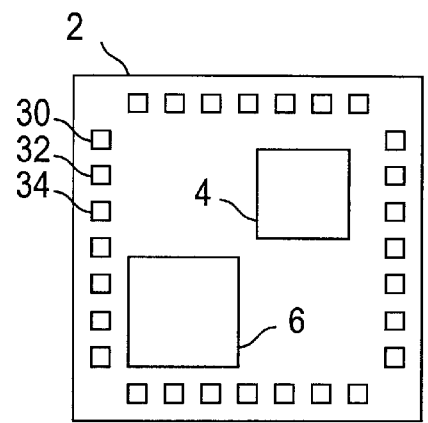
FIG. 3 is a top plan view of a single FIG. 2 microprocessor die.

FIG. 3 illustrates a microprocessor 2, or die, which has been sliced free of the silicon wafer 20 but has not yet been placed in a package. Along with the elements of the microprocessor 2 such as the core execution unit 4 and the internal memory 6, many tiny connectors or pads (e.g., 30, 32, and 34) are provided on the microprocessor 2.

Figure 4:
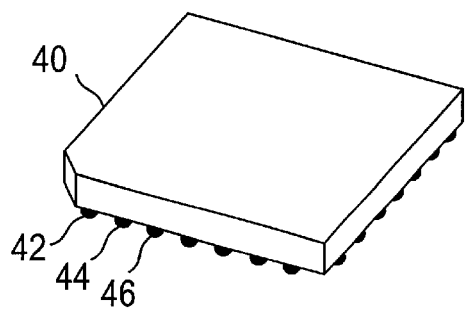
FIG. 4 is a perspective view of a packaged microprocessor with surface mount contacts.

The next major step of fabrication is placing the microprocessor 2 in a package 40, as shown in FIG. 4. The tiny pads (e.g., 30, 32, and 34) are wire-bonded, or connected, to external connectors (e.g., 42, 44, and 46). The microprocessor 2 may then be burned-in, or operated for a brief period of time, in order to identify latent defects, i.e., defects which do not occur until the microprocessor 2 has not been operated. For example, partial short circuits may have no negative effect on a microprocessor's 2 operation. However, normal operation of the microprocessor 2 may cause the partial short circuit to heat up and become a full short circuit.

The tester 16 may be connected to the microprocessor 2 at any of the stages of fabrication described above, such as on the wafer, after slicing the dice apart, after packaging, or after burn-in, depending on the requirements of the fabricator. For example, it may be advantageous to perform multiple tests of a microprocessor 2 at the various stages described above in order to reject defective parts as early as possible, thereby saving the cost of completing work on those defective parts. In other fabrication environments, it may be more cost effective to complete all parts and test only once after completion.

It is also desirable to simulate the present testing system before fabrication. During the design of a microprocessor 2, and before fabrication, the microprocessor 2 is simulated at very low frequency (e.g., 1 Hz) on a computer. During this simulation, the RCG may be executed on the simulated core execution unit 4. In this simulated environment, the state of the microprocessor 2 can be compared to expected results after each instruction, rather than once after completion of the test case.

Figure 5:
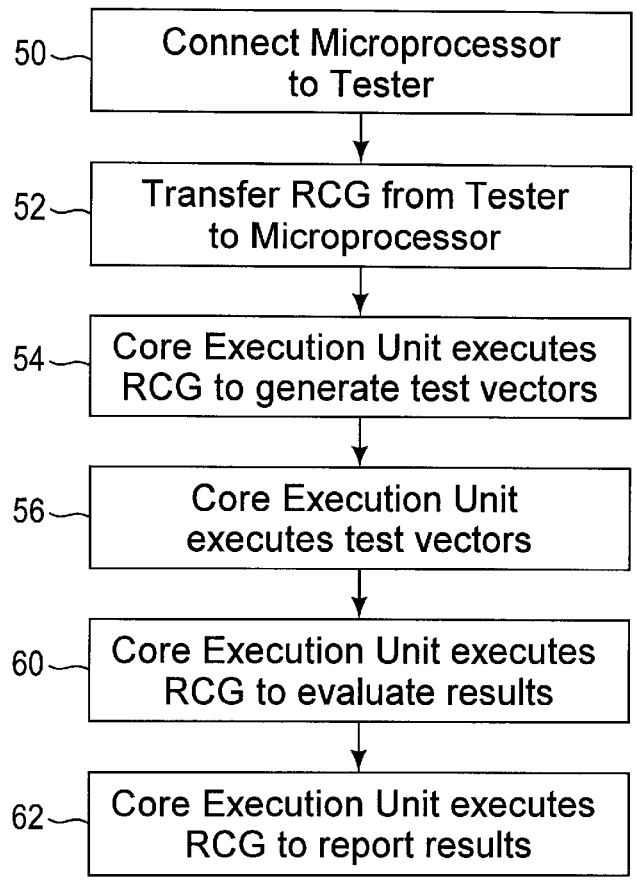
FIG. 5 is a flow chart illustrating a method of testing a microprocessor.

FIG. 5 is a flow chart illustrating a method of testing a microprocessor according to the preferred embodiment. First, a tester is connected 50 to a microprocessor across a serial bus. The tester then transfers 52 an RCG program across the serial bus to the internal memory of a microprocessor. The core execution unit of the microprocessor executes 54 the RCG, generating test vectors which are stored in the microprocessor's internal memory. After the test vectors are generated, the core execution unit executes 56 them. The last instruction of the test vectors then causes the execution pointer in the core execution unit to jump back into the RCG program. The core execution unit continues executing the RCG program, which evaluates 60 the results of the preceding test by comparing the state of the microprocessor with an expected state. The RCG, executed by the core execution unit, then reports 62 the results of the test to the tester. As described above, the microprocessor may be tested during any stage of fabrication.

Figure 6:
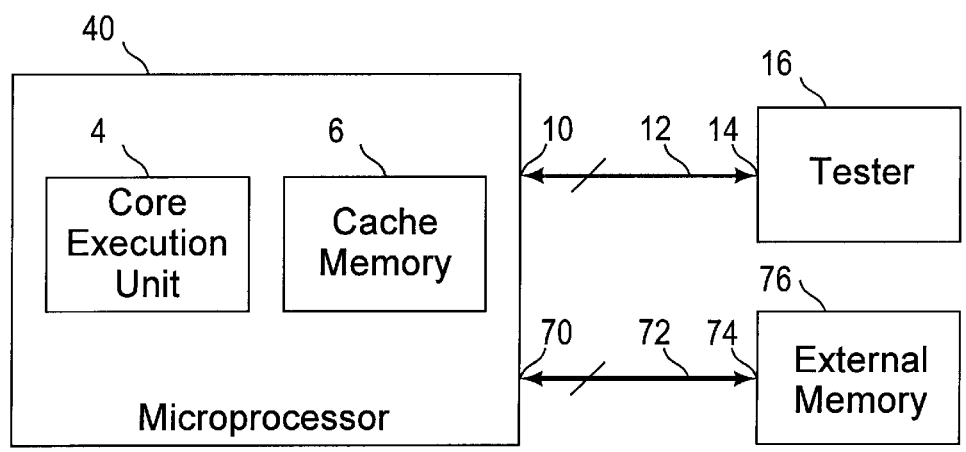
FIG. 6 is a block diagram of a system for testing a microprocessor including an external memory.

Referring now to FIG. 6, an external memory 76 may also be connected to a packaged microprocessor 40 if desired to test the microprocessors 40 ability to access external memory. This option may not be necessary if it is accomplished during other steps of fabrication such as the burn-in phase. If an external memory 76 is tested, a tester 16 is connected to the microprocessor 40 through a serial connection 12 as described above, using a microprocessor serial port 10 and a tester serial port 14. The tester transfers an RCG to the internal memory 6 of the microprocessor 40, which then executes the RCG in its core execution unit 4. The external memory 76 is connected to the microprocessor 40 through a bus 72, which may comprise a parallel address and data bus as needed. The bus 72 connects to a parallel port 70 on the microprocessor 40, and to a parallel port 74 on the external memory 76.

In this embodiment, during evaluation of the results of a test case, the RCG compares the state of the microprocessor 40, including the state of the external memory 76, to expected values. Rather than compare every memory location in the external memory 76 to expected results, the RCG may only examine memory locations which should have been accessed by the core execution unit during execution of the test vectors.

Figure 7:
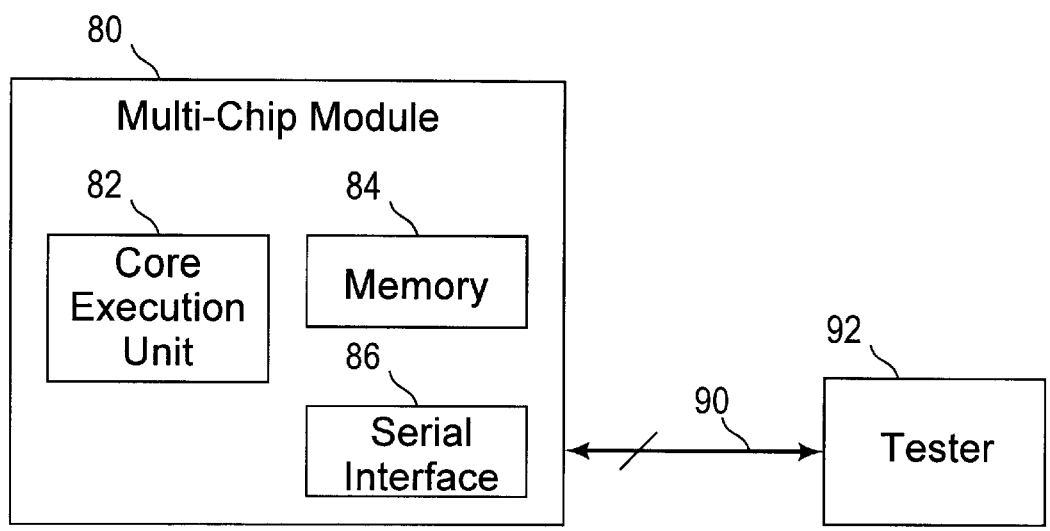
FIG. 7 is a block diagram of a system for testing a multi-chip module.

In another embodiment, illustrated in FIG. 7, the device under test comprises a multi-chip module (MCM) 80. A multi-chip module 80 is a circuit or module comprised of multiple discrete, active electronic components which are interconnected and provided with one external interface. The discrete components may be interconnected by soldering, welding, chemical deposition, metallization, thermocompression bonds, or other methods of electrically connecting the components. In this embodiment, the MCM 80 appears to the low-cost tester to be one integrated circuit having a single low cost interface, such as a serial port.

The MCM 80 comprises one or more core execution units 82, each on their own die, and electrically interconnected with the other chips or dice in the module. Each core execution unit 82 may or may not have an internal cache. The MCM 80 further comprises one or more memories 84, each on their own die, and electrically interconnected with the other dice in the module. A serial interface 86 or other low cost interface allows a low cost tester 92 to be connected to the MCM 80 across a low pin count connection 90.

The low cost tester 92, which may have a relatively slow, inexpensive memory, loads an RCG into the one or more memories 84 on the MCM 80, and the core execution unit 82 then executes it at full speed inside the module 80. Therefore, a parallel pin tester with fast, expensive memory is not needed since test vectors are not transferred across the external interface during test.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of testing a microprocessor, wherein said microprocessor comprises a core execution unit, an internal memory and a data port, comprising:

providing a tester comprising a data port and a memory;

providing a test vector generator program in the memory of said tester;

connecting said microprocessor data port to said tester data port;

transferring said test vector generator program from said tester, through said tester data port and said microprocessor data port to said internal memory;

executing said test vector generator program in said core execution unit to generate test vectors, said method being performed before said microprocessor is placed in a package;. and executing said test vectors in said core execution unit.

2. A method of testing a microprocessor, wherein said microprocessor comprises a core execution unit, an internal memory and a data port, comprising:

providing a tester comprising a data port and a memory;

providing a test vector generator program in the memory of said tester;

connecting said microprocessor data port to said tester data port;

transferring said test vector generator program from said tester, through said tester data port and said microprocessor data port to said internal memory;

executing said test vector generator program in said core execution unit to generate test vectors;

executing said test vectors in said core execution unit; and placing said microprocessor in a package before connecting said microprocessor data port to said tester data port, transferring said test vector generator program and executing said test vector generator program.

3. A method of testing a microprocessor, wherein said microprocessor comprises a core execution unit, an internal memory, a data port, and a timer, comprising:

providing a tester comprising a data port and a memory;

providing a test vector generator program in the memory of said tester;

connecting said microprocessor data port to said tester data port;

transferring said test vector generator program from said tester, through said tester data port and said microprocessor data port to said internal memory;

executing said test vector generator program in said core execution unit to generate test vectors;

storing said test vectors in said internal memory;

executing said test vectors in said core execution unit;

setting a timer for a predetermined duration before executing said test vector generator program; and said tester indicating a failure in said microprocessor if said test vectors do not complete execution and said completed execution is not reported to said tester before said timer runs for said predetermined duration.

4. A method of testing a microprocessor, wherein said microprocessor comprises a core execution unit, an internal memory, and a data port, comprising:

providing a tester comprising a data port and a memory;

providing a test vector generator program in the memory of said tester;

connecting said microprocessor data port to said tester data port;

transferring said test vector generator program from said tester, through said tester data port and said microprocessor data port to said internal memory;

executing said test vector generator program in said core execution unit to generate test vectors;

storing said test vectors in said internal memory;

executing said test vectors in said core execution unit;

said test vector generator program setting a timer for a predetermined duration before executing said test vectors; and said test vector generator program indicating a failure in said microprocessor if said test vectors do not complete execution before said timer runs for said predetermined duration.

5. A method of testing a microprocessor, wherein said microprocessor comprises a core execution unit, an internal memory, and a data port, comprising:

providing a tester comprising a data port and a memory;

providing a test vector generator program in the memory of said tester;

connecting said microprocessor data port to said tester data port;

transferring said test vector generator program from said tester, through said tester data port and said microprocessor data port to said internal memory;

executing said test vector generator program in said core execution unit to generate test vectors and expected results for said test vectors;

storing said test vectors in said internal memory;

executing said test vectors in said core execution unit; and said test vector generator program comparing a state of said microprocessor with said expected results to determine whether said microprocessor is defective wherein said state of said microprocessor comprises a state of one or more registers in said microprocessor.

6. A method of testing a microprocessor, wherein said microprocessor comprises a core execution unit, an internal memory, and a data port, comprising:

providing a tester comprising a data port and a memory;

providing a test vector generator program in the memory of said tester;

connecting said microprocessor data port to said tester data port;

transferring said test vector generator program from said tester, through said tester data port and said microprocessor data port to said internal memory;

executing said test vector generator program in said core execution unit to generate test vectors and expected results for said test vectors;

storing said test vectors in said internal memory;

executing said test vectors in said core execution unit; and said test vector generator program comparing a state of said microprocessor with said expected results to determine whether said microprocessor is defective, wherein said state of said microprocessor comprises a state of a translation lookaside buffer.

7. A method of testing a microprocessor, wherein said microprocessor comprises a core execution unit, an internal memory, a data port, a data bus, and an address bus, comprising:

providing a tester comprising a data port and a memory;

providing a test vector generator program in the memory of said tester;

connecting said microprocessor data port to said tester data port;

transferring said test vector generator program from said tester, through said tester data port and said microprocessor data port to said internal memory;

executing said test vector generator program in said core execution unit to generate test vectors and expected results for said test vectors;

storing said test vectors in said internal memory;

executing said test vectors in said core execution unit;

said test vector generator program comparing a state of said microprocessor with said expected results to determine whether said microprocessor is defective; and providing an external memory and connecting said external memory to said data bus and said address bus, wherein said state of said microprocessor is dependent upon a state of one or more memory locations in said external memory.

* * * * *